Sept. 22, 1925.

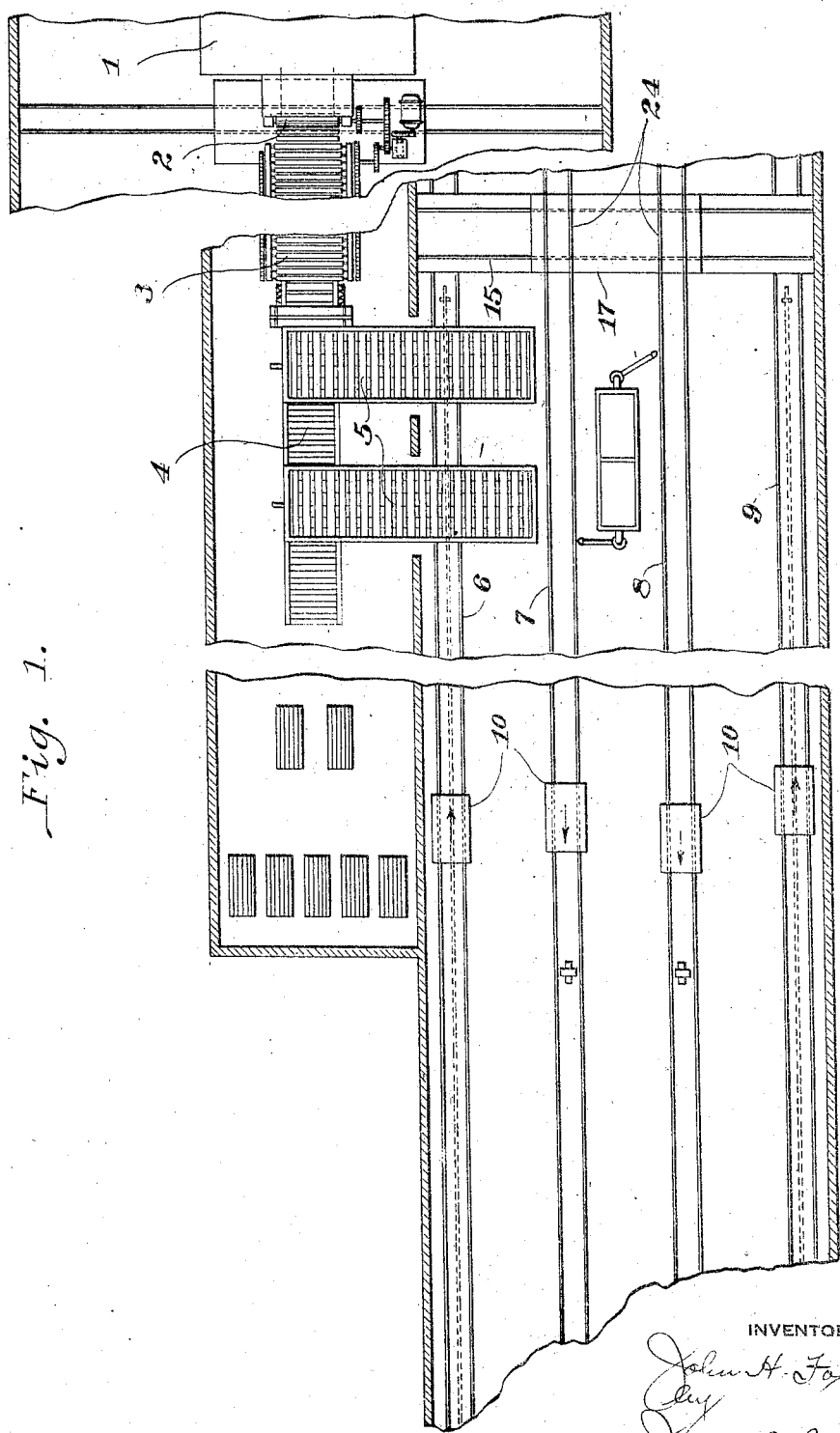

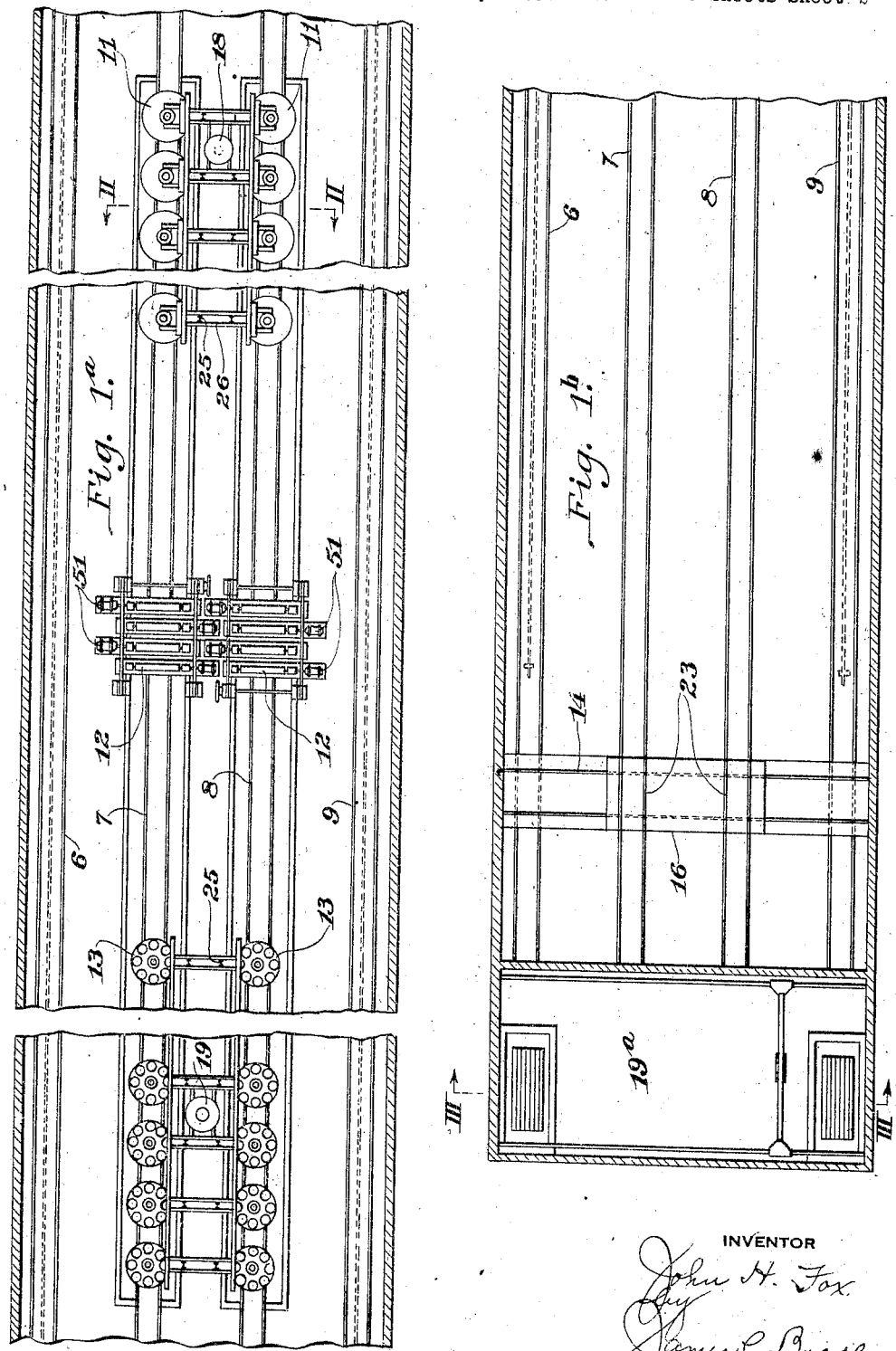

J. H. FOX 1,554,804

APPARATUS FOR SURFACING SHEETS

Filed Sept. 13, 1923    5 Sheets-Sheet 3

INVENTOR
John H. Fox
James C. Bradley
atty.

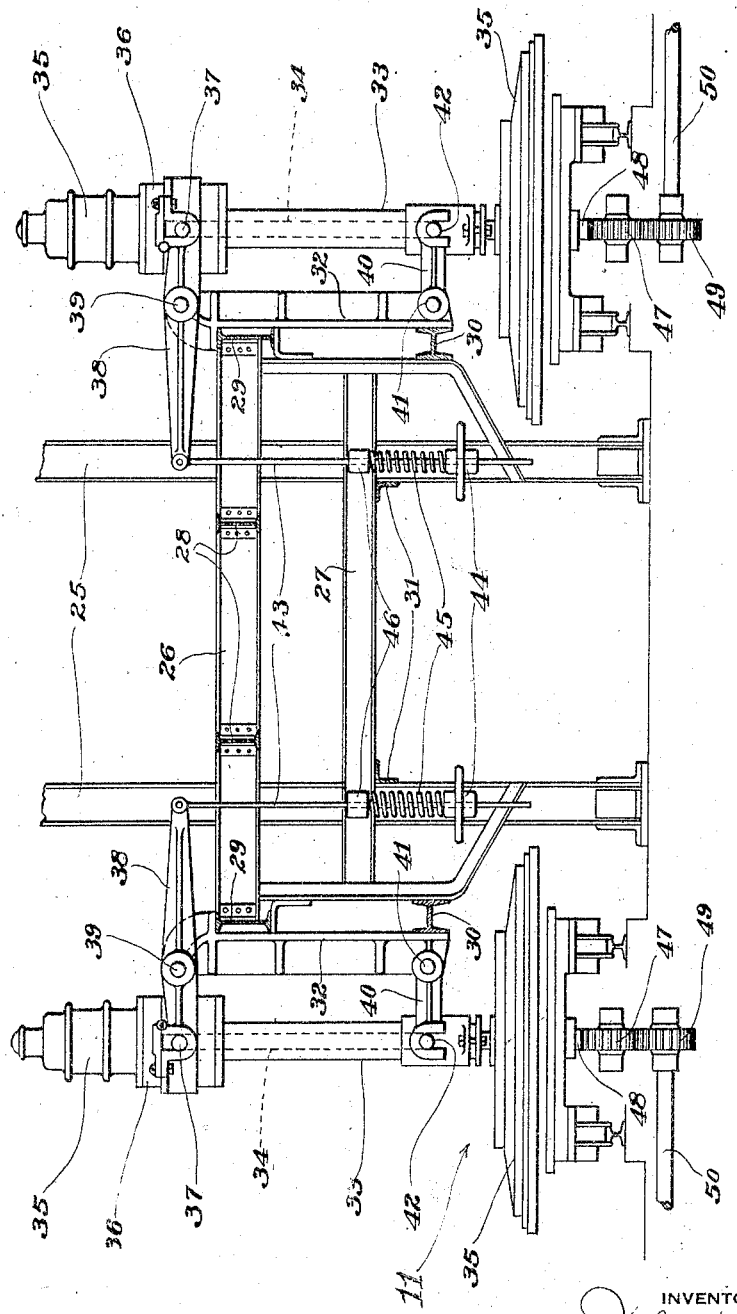

Sept. 22, 1925. 1,554,804
J. H. FOX
APPARATUS FOR SURFACING SHEET
Filed Sept. 13, 1923  5 Sheets-Sheet 5

INVENTOR
John H. Fox
James C. Bradley
atty

Patented Sept. 22, 1925.

1,554,804

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

APPARATUS FOR SURFACING SHEETS.

Application filed September 13, 1923. Serial No. 662,439.

*To all whom it may concern:*

Be it known that I, JOHN H. FOX, a citizen of the United States, and a resident of Pittsburgh, in the county of Allegheny and State of Pennsylvania, have made a new and useful invention in Improvements in Apparatus for Surfacing Sheets, of which the following is a specification.

Figure 1C:
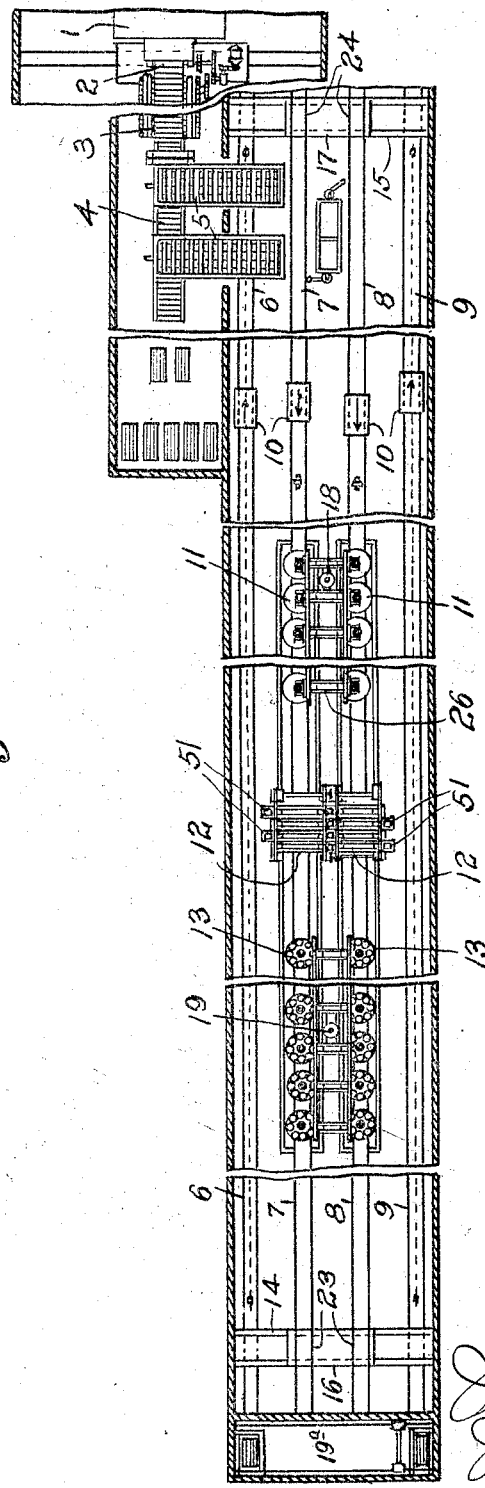

The invention relates to apparatus for surfacing sheets such as plate glass, marble or the like, the apparatus being illustrated and described as applied to the grinding and polishing of plate glass. It has for its principal objects the provision of an improved straight away system or arrangement for handling the trucks or cars for carrying the glass beneath successive surfacing machines. One embodiment of the invention is illustrated in the accompanying drawings wherein:

Figure 1 is a diagrammatic plan view of the forward end of the apparatus. Fig. 1ª is a similar view of the next position of the apparatus. Fig. 1ᵇ is a similar view of the rear end of the apparatus. Fig. 1ᶜ is a diagrammatic plan view showing the entire apparatus of the partial views 1, 1ª and 1ᵇ. Fig. 2 is a section on the line II—II of Fig. 1ª. And Fig. 3 is a section on the line III—III of Fig. 1ᵇ.

Referring first to the general arrangement of parts, 1 is the outlet end of a melting tank provided with an outlet slot and a pair of rolls 2 for continuously forming a sheet or ribbon of glass; 3 is an annealing leer of the roller type through which the ribbon of glass is conducted; 4 is a receiving table upon which the glass from the leer is received and upon which it is cut into sections of a length convenient for handling; 5, 5 are roller transfer tables extending laterally from the receiving table; 6, 7, 8 and 9 are parallel tracks; 10 are cars mounted on the tracks for receiving the glass from the transfer tables; 11 are a plurality of grinding machines arranged in series above the tracks 7 and 8; 12 are a series of brushes arranged over each of the tracks 7 and 8; 13 are a plurality of polishing machines arranged in series over the tracks 7 and 8; 14 and 15 are transfer tracks arranged at each end of the tracks 6, 7, 8 and 9 and each provided with a transfer car 16 and 17; 18 is a grading cone for grading the abrasive supplied to the grinding machines; and 19 is a rouge tank from which a supply of rouge is fed to the various polishing machines 13.

Figure 3:
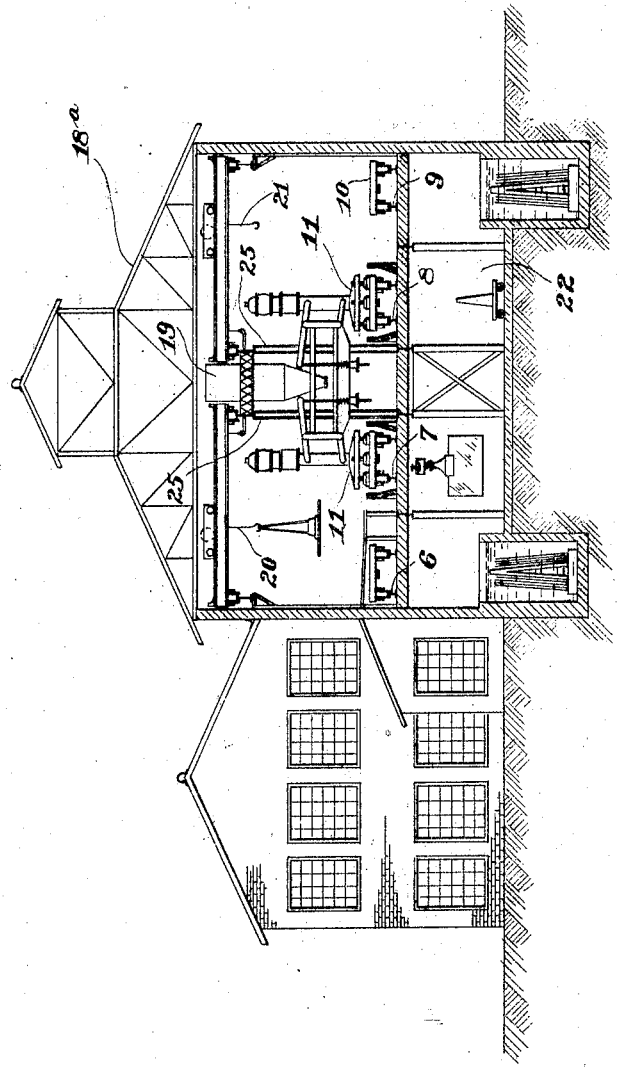

The four tracks 6, 7, 8 and 9 preferably occupy the second story of the building 18ª as indicated in Fig. 3, and at the left hand end of this building an open bay 19ª is provided over which are mounted suitable cranes 20 and 21 so that the glass, after it has been ground and polished and removed from the tables may be lowered to the bottom floor 22 where the glass may be washed, inspected, cut and packed. The two transfer tables 16 and 17 are provided with a pair of tracks 23 and 24, and the tracks 6, 7, 8 and 9 are spaced apart equal distances so that the two tracks 23 and 24 may always be made to align with two of the tracks 6, 7, 8 and 9, either when the transfer cars are in their middle positions as illustrated or when they are moved laterally to their extreme positions.

The grinding machines are preferably of the construction illustrated in Fig. 2 being supported upon a central framework of commercial sections, the upright members 25 of which constitute a portion of the framework of the building covering the grinding and polishing system. The uprights are suitably braced by the transverse members 26 and 27 and are tied together in a longitudinal direction by means of the sections 28, 29, 30 and 31. Secured to the outer sides of this framework are the cast frame members 32 upon which the grinding runners and their driving mechanism are supported.

The grinding machines or units each consist of a casing 33 in which is journaled the runner spindle 34, to the lower end of which is secured the runner 35 which may be of any approved construction. The spindle 34 is driven from a motor 35 through the intermediary of suitable reducing gearing located in the casing 36. The casing 36 is provided with laterally extending trunnions 37 which are engaged by the forked lever 38 pivoted at 39 upon the bracket 32. The lower end of the casing 33 is held in position by a second forked link 40 pivoted to the bracket at 41 and having a hooked end which fits over the trunnions 42 on the casing. This arrangement provides for the ready removal of any grinding unit for replacement or repair. The inner end of the lever 38 may be adjusted vertically to adjust the pressure of the runner upon the glass by means of the rod 43 threaded at its lower end and carrying the hand wheel 44 whose hub is threaded upon the end of the rod. A spring 45 interposed between the bracket 46 carried by the framework and the hand wheel serves to cushion the movements of the runner.

The tables 10 which are employed may be of any desired construction, such as illustrated in my copending application, Serial No. 544,781 and are moved along beneath the grinding and polishing machines by means of the pinions 47 which engage racks 48 upon the bottoms of the cars, the pinions 47 being driven from gears 49 carried by shafts 50 provided with suitable driving means. The polishing machines 13 are of substantially similar construction except that in place of the runners 35 suitable polishing runners are substituted. The supporting framework for the polishing runners is also the same as that illustrated and described in connection with the grinding machines.

The brushes 12 which are located intermediate the grinding and polishing machines are preferably of the type illustrated in the patent to Christopher Brown, No. 1,480,542, each brush being driven by its own motor 51, and the series of brushes serving to give the glass on the tables a semi-polish preliminary to the final polishing action by the polishing machines 13, so that the number of polishing machines which would otherwise be required is reduced. Any other suitable means for accomplishing this function might be employed, or if desired these brushese may be dispensed with.

The operation of the apparatus is as follows:

A ribbon of glass is formed continuously between the rolls 2 and passes through the leer 3 to the table 4 where it is cut into sections and moved laterally upon one or both of the transfer tables 5, 5, such tables being preferably provided with rollers to facilitate the movement of the glass and being spaced above the track 6 a distance sufficient to permit the passage of the cars which are returned along the track 6 to the extreme right hand end of such track as hereinafter set forth. The glass sheets from the tables 5, 5 are placed upon the cars 10 on the track 7 and secured to the tops of such tables preferably by the use of plaster, although other means may be employed if desired. The cars as they are supplied with glass are placed end to end and coupled together so that when carried beneath the grinding and polishing units they constitute a continuous, uninterrupted carrier, their movement ahead being accomplished by means of the racks and pinions illustrated in Fig. 2, arranged at suitable intervals along the track. The cars are carried first beneath the grinding machines 11, then beneath the brushes 12 and finally beneath the polishers 13 which completes the finishing of one surface of the sheets. The cars then pass upon one of the tracks 23 of the transfer car 16 which is shifted laterally to bring such track into alignment with the track 6. These cars carrying the glass having one side finished are then returned along the track 6 to the right hand end of such track where they are run onto one of the tracks 24 of the transfer car 17 and such car is brought over into alignment with the track 8 and run onto such track. During this period of transfer, or after the cars arrive upon the track 8, the glass is loosened, the table cleaned and the sheet reversed in position to bring its rough side up. The sheet is then again secured to the table by means of plaster, this preferably being accomplished at the right hand end of the track 8. The cars are now carried along the track 8 beneath the series of grinding and polishing machines and the rough surface which is now up is given a finish similar to that given to the first side, so that when the cars arrive at the left hand end of the track 8, both sides of the sheets are finished. At this point the glass is removed from the cars and transferred by means of the cranes 20 and 21 down through the open bay 19$^a$ to the first floor of the building where the glass is washed and taken care of. The empty cars are then run onto the transfer car 16 and transferred to the track 9 on which they are returned to the right hand end of the track. From this position they are then brought over by the car 17 to the track 7, thus completing the cycle, the empty cars now being ready to receive glass again from the transfer tables 5, 5.

The system involving the four tracks is advantageous for a number of reasons. The arrangement brings the grinders for the two sides opposite each other, thus simplifying the grading apparatus, as one set of such apparatus can be used to supply both sets of grinders. Similarly as to the rouge supplying apparatus for the polishers. The use of the central framework with the laterally extending supports for the grinders and polishers, gives convenient access to the two sets of machines from the open space therebetween, while on the outer sides, opportunity is afforded for the ready removal of the grinding and polishing units for replacement or repair, this being accomplished by means of suitable cranes (not shown) mounted on suitable runways extending longitudinally of the building. The use of the two return tracks 6 and 9 provides for the return of the empty cars and cars carrying sheets with one side finished without crowding or confusion, while permitting of a simple convenient transfer means at the ends of the tracks. The overlapping of the leer end and end of the track system, permits of ready and convenient transfer from the leer to the surfacing apparatus and gives an opportunity for extending the leer or storage space at the end of the leer to meet requirements, which could not be done with the leer in alignment with the tracks of the surfacing machines. Since the glass which is rough on both sides is all ground on the one side on track 7, and all that which is rough on one side and smooth on the other is ground on track 8, the glass sheets on the tables of track 7 are of nearly uniform thickness, which is also the case with the sheets on track 8, so that the runners pass more smoothly from one sheet to the next than would be the case if such sheets, rough on both sides, alternated with sheets rough on one side only, such as would be the case if both kinds of sheets were surfaced on each track.

What I claim is:

1. In combination in grinding and polishing apparatus, a pair of adjacent parallel tracks, cars for carrying sheets to be surfaced along such tracks, a plurality of grinding machines arranged in series along each track followed by a plurality of polishing machines also arranged in series along each track with the grinding machines on one track opposite those on the other track, and the polishing machines on one track opposite those on the other track, a return track along the outer side of one of said tracks, a second return track on the outer side of the other of said tracks, and transfer means between the four tracks at both ends thereof so that the cars at one end of the tracks may be shifted from the pair of parallel tracks to the return tracks, and the cars at the other ends of the tracks may be shifted from the return tracks to said pair of parallel tracks.

2. In combination in grinding and polishing apparatus, a pair of adjacent parallel tracks, cars for carrying the sheets to be surfaced along such tracks, grinding and polishing machines arranged in series above each track, with the grinding machines on one track opposite the grinding machines on the other track and the polishing machines on one track opposite those on the other, a pair of return tracks one of which lies on one side of said parallel tracks and the other of which lies on the other side of said pair of parallel tracks, and transfer means between the four tracks at both ends whereby the cars at one end of the system carrying the glass with one side finished may be shifted from one of the parallel tracks to one return track and the other cars may be shifted from the other of the parallel tracks to the other return track, and whereby the cars at the other end of the system carrying the glass with one side finished may be shifted from said return track to one of the parallel tracks; and said other cars (now empty) may be shifted from the other return track to the other of the parallel tracks.

3. In combination in grinding and polishing apparatus, a pair of adjacent parallel tracks, cars for carrying the sheets to be surfaced along such tracks, a central framework extending longitudinally of the tracks therebetween, supports extending out laterally from said framework on each side thereof and overhanging the two tracks, driven surfacing units carried by said supports over the said tables, a return track on the outer side of each of said parallel tracks, transfer means at the exit ends of the parallel tracks whereby the cars from one of such parallel tracks may be shifted to one of said return tracks, and whereby the cars from the other of said parallel tracks may be shifted to the other return track, and transfer means at the entrance ends of said parallel tracks whereby the cars from one of said return tracks may be shifted to one of said parallel tracks and whereby the cars from the other return tracks may be shifted to the other of the parallel tracks.

In testimony whereof, I have hereunto subscribed my name this 10th day of September, 1923.

JOHN H. FOX.